Aug. 20, 1946.  E. A. TAMBERT  2,406,267

ACCOUNTS PAYABLE SYSTEM

Filed April 19, 1944

Inventor
Elmer A. Tambert
By Lyon & Lyon
Attorneys

Patented Aug. 20, 1946

2,406,267

UNITED STATES PATENT OFFICE 2,406,267

ACCOUNTS PAYABLE SYSTEM

Elmer A. Tambert, Sierra Madre, Calif.

Application April 19, 1944, Serial No. 531,745

2 Claims. (Cl. 282—22)

This invention relates to a system for simultaneous, uniform and identical recording of business purchases which are to be paid for by check or an accounts payable system.

It is an object of the present invention to provide a unique and novel device and system for compiling accounts payable records and statistics which will eliminate human errors resulting from transferring information from an original document to other sheets, ledgers, books, cards, machines, punch cards, and other devices now in general use.

A further object of the present invention is to provide a system and device which will save much clerical labor and lower the training and educational requirements of accountants, and which will, at the same time, eliminate many of the unnecessary accounting operations, paper, forms, books, machines, files, and devices now in general use.

A further object of the present invention is to provide an accounting device and system by means of which vendors may be furnished with copies of voucher checks by which the remittance statement definitely reconciles with the check covering payment to the vendor.

In the system of the present invention, the preparation of the voucher check, voucher register, remittance statement, accounts payable record, voucher check register and accounting distribution record are combined and a single unit for this purpose furnished which allows for a single entry.

The present invention will be understood by reference to the accompanying drawing in which are shown, by way of illustration merely, the preferred devices for and systems employed in keeping accounts payable according to my improved devices and system, in which Figure 1 is a voucher check.

Figure 2 is an original voucher and copy of a voucher check containing an accounting distribution register.

Figure 3 is a similar sheet, except the accounting distribution register is made detachable from the remainder of the sheet, the remainder of the sheet being intended to serve as a remittance statement and copy of the voucher check.

Fig. 4 is a sheet similar to Fig. 2 but formed of relatively heavier paper and intended to serve as an accounts payable voucher.

Fig. 5 is a section through the device.

Referring first to Fig. 1 of the drawing, I have there illustrated a voucher check which is indicated as possessing, in addition to the usual spaces for entry of the date, amount of the check, name of the payee, and name of the maker, space for entry of the address of the payee and for the entry of the check number and also the number of the accounts payable voucher corresponding to the voucher check. The body of the voucher check proper is indicated as atttached to a tear strip at its upper end by means of which tear strip the voucher check may be combined with the other elements of the device, in a manner hereafter to be described.

Now referring to Fig. 2 of the drawing, the upper portion of the sheet is formed in the substantially identical manner of the voucher sheet shown in Fig. 1, having similar blanks for the entry of similar data and in such position that the original entry of data on the voucher sheet of Fig. 1 may, by transfer through carbon paper, be simultaneously entered on the sheet of Fig. 2. In addition thereto, the sheet shown in Fig. 2 of the drawing embodies columns in juxtaposition for forming a statement of the account, in which initial columns are provided for entry of invoice or item. Identical juxtapositioned columns are provided for entry of the amount of such invoice or item; juxtapositioned columns are provided for the entry of discount or deduction corresponding to said invoice or item, and a juxtapositioned column is provided for entry of that amount of said invoice or item. Above such statement of accounts are designated entry points for signature or initials of parties preparing or entering and numbering the same.

The sheet of Fig. 2 is also made to include at the lower portion of the sheet an account distribution register which includes juxtapositioned columns for entry of the number of the shop contract or project to which the invoice, or a part thereof, is to be distributed, together with sections for entry of the amounts so distributed; also juxtapositioned sections for the entry of the amount distributed to vendor and the vendor account to which it is distributed. Juxtapositioned sections are also provided for the amount distributed to indirect expense and to the indirect expense account to which the amount is so distributed. Also juxtapositioned sections are provided for the amount of and the account to which any portion may be distributed under the heading "Miscellaneous or general ledger."

The original voucher and copy of voucher check shown in Fig. 2 of the drawing, serves as a means of recording the invoice or bills received from the same vendor or supplier, by means of which the invoices or bills may be consolidated into one payment at any time. The original voucher and copy of voucher check sheets of Fig. 2 also may serve as a voucher register, voucher check register, and as a cross-reference to accounts payable, accounting record, and distribution of accounts. The sheet also serves as a means for verifying the cancelled check when it is returned by the bank paying it. There is thus afforded, on the single sheet containing a carbon copy of each voucher check and by which such voucher check may be positively identified, a substantially complete record of the business purchaser, purchases so as to be paid for by said check, and a complete statement of the distributions made of such account. In this way I eliminate human errors resulting from transfer of information from other documents or sheets.

Now referring to Fig. 3 of the drawing, the sheet there illustrated may be identical with that of Fig. 2 of the drawing, except the accounts distribution portion of the sheet is made separable from the balance of the sheet. This sheet therefore includes sections for the entry by carbon paper as hereafter pointed out, of all data entered upon the voucher check of Fig. 1 of the drawing, and also all data entered upon the original voucher and distribution register constituting Fig. 2 of the drawing. The upper portion of the sheet constituting Fig. 3 is intended to serve as a remittance statement to be forwarded to the vendor with the voucher check, and thus constitutes a means for effecting a statement of an account. The lower portion of the sheet may serve as an accounting distribution record.

Now referring more particularly to Fig. 4 of the drawing, the sheet of this figure is indicated as of substantially identical form as the sheets of Fig. 2 and containing identical sections for entry by carbon paper of the entries made on the voucher check of Fig. 1 or the register of Fig. 2 of the drawing. This sheet is preferably formed of relatively heavy, stiff paper in order that it may serve as a means for compilation of all invoices received, and any other papers which may relate to the transaction, or transactions, covered by the voucher checks, which in the use of the system of the present invention are later to be stapled to the sheet constituting Fig. 4 of the drawing, and thus serve as a permanent record of the complete transactions covered by the voucher check.

As illustrated in the drawing, each of the sheets of Figs. 1, 2, 3 and 4 of the drawing, has an upper tab separated therefrom by a tear strip, and in constructing the unit of the present invention these tabs are used for stapling the sheets together into a single unit, it being understood that carbon paper is placed between each of the sheets, the voucher check of Fig. 1, being at the top, followed by carbon paper; then the sheet of Fig. 2, then carbon paper; then the sheet of Fig. 3, then carbon paper; and finally the sheet shown in Fig. 4. While I have indicated the above particular order of assembling the parts of the present invention, they might be assembled in other orders, and in certain instances, perhaps, all of the sheets might be produced on one sheet of paper, stapled, and folded together or manufactured on separate sheets, and they may obviously be fastened together by means other than stapling, as, for example, gluing, sewing, binding, and the like.

The operation of the accounts payable device and system of the present invention is as follows: After the first invoice or evidence of charge is received from a vendor or supplier, the vendor's name and address is written, or typewritten, on the voucher check of Fig. 1. By means of the transferring qualities of carbon paper between the voucher check and remaining parts of the device, the same identical information is simultaneously transferred to the sheets illustrated in Figs. 2, 3 and 4. The identity of the charge is then entered under the statement of account section of the sheet shown in Fig. 2, and this entry is likewise transmitted to the sheets shown in Figs. 3 and 4. The device is then set aside, pending possible receipt of additional invoices or charges from the same vendor.

If, and when, additional invoices are received from the same vendor, they are likewise suitably entered in the statement of account portion of the sheet shown in Fig. 2, this additional information being also transmitted to Figs. 3 and 4 simultaneously and identically.

At the end of the month, or at any time desired, the voucher unit, may be closed and prepared for payment. For this operation, simply total the invoices or charges entered on the sheet of Fig. 2, the discounts calculated on those invoices where such discounts are authorized, and determine the net amounts. Summation of the net amount is then transferred to the voucher check of sheet shown in Fig. 1, and the entry of this sum is simultaneously made on the sheets of Figs. 2, 3 and 4; there is then computed and entered the accounting distribution of the voucher which has been prepared for payment. The impression of this record which is made on the sheet of Fig. 2 is likewise transmitted to the sheets of Figs. 3 and 4. The entire accounts payable device is then transmitted to proper officials for approval and signature, along with the invoice and evidence of charges which may be attached thereto by paper clips. The unit provides for a ready means for the official determining the propriety of the issuance of such voucher check, allowing such official not only to determine the vouchers covered by said check, but also the accounting distribution made.

After the voucher check has been duly signed the accounts payable sheet is separated into its component parts by tearing at the different tear lines indicated. The voucher check and the upper half of the sheet of Fig. 3 or the remittance statement, are forwarded to the vendor, supplier, or creditor. The sheet forming Fig. 2 is a permanent numerical file; the accounting distribution section detached from the sheet of Fig. 3 serves for internal and detailed accounting use. The heavy sheet constituting Fig. 4 of the drawing serves as a means for stapling and attaching all invoices and papers to form a file under the vendor's name which will serve as a permanent record.

After the cancelled check is returned from the bank it should be compared with and matched with its copy on the sheet of Fig. 2, which is readily locatable in the numerical file. The cancelled check should then be attached to the file and all copies attached at any time to provide an exact and complete record of any outstanding check for the purpose of bank reconciliation.

The unit disclosed in the present invention therefore eliminates human errors which now result from the present practice of transferring information from original documents to other sheets, etc., and permits the saving of much clerical labor in keeping accounts, and permits the use of less skilled accountants.

I claim:
1. In an accounts payable system comprising a plurality of sheets attached together and having transfer material therebetween, each of said sheets containing a blank bank check portion and a blank portion having suitably indexed columns for the entry of invoice amounts and deductions to be covered by said bank check when completed, each of said sheets having a blank portion suitably indexed for the entry of invoice distribution, identification and amounts, the latter portion of one of said sheets being separable from the remainder of the sheets.

2. In an accounts payable system comprising a plurality of sheets attached together and having transfer material therebetween, each of said sheets containing a blank bank check portion and a blank portion having suitably indexed columns for the entry of invoice amounts and deductions to be covered by said bank check when completed, each of said sheets having a blank portion suitably indexed for the entry of invoice distribution, identification and amounts, the latter portion of one of said sheets being separable from the remainder of the sheets, and an upper blank bank check in registry with the blank bank check portions of the other sheets when separated from the other of said sheets by transfer material.

ELMER A. TAMBERT.